US012760149B2

(12) United States Patent
Choi et al.

(10) Patent No.: US 12,760,149 B2
(45) Date of Patent: Oct. 13, 2026

(54) THERMOPLASTIC COMPOSITE MATERIAL COMPOSITION HAVING EXCELLENT ELECTROMAGNETIC RADIATION SHIELDING PERFORMANCE

(71) Applicants: HYUNDAI MOTOR COMPANY, Seoul (KR); KIA CORPORATION, Seoul (KR); HDC HYUNDAI ENGINEERING PLASTICS CO., LTD., Dangjin-si (KR)

(72) Inventors: Seung Woo Choi, Seoul (KR); Eun Seob Shin, Yongin-si (KR); Kang Il Jeon, Yongin-si (KR); Jin Cheol Kim, Dangjin-si (KR)

(73) Assignees: HYUNDAI MOTOR COMPANY, Seoul (KR); KIA CORPORATION, Seoul (KR); HDC HYUNDAI ENGINEERING PLASTICS CO., LTD., Dangjin-si (KR)

( * ) Notice: Subject to any disclaimer, the term of this patent is extended or adjusted under 35 U.S.C. 154(b) by 689 days.

(21) Appl. No.: 18/076,083

(22) Filed: Dec. 6, 2022

(65) Prior Publication Data

US 2023/0192954 A1 Jun. 22, 2023

(30) Foreign Application Priority Data

Dec. 20, 2021 (KR) ........................ 10-2021-0182386

(51) Int. Cl.

| | |
|---|---|
| ***C08G 69/14*** | (2006.01) |
| ***C08F 110/02*** | (2006.01) |
| ***C08J 3/22*** | (2006.01) |
| ***C08K 3/04*** | (2006.01) |
| ***C08K 3/08*** | (2006.01) |
| ***C08K 3/14*** | (2006.01) |
| ***C08K 3/40*** | (2006.01) |
| ***C08K 5/053*** | (2006.01) |
| ***C08K 7/06*** | (2006.01) |
| ***C08K 9/06*** | (2006.01) |

(52) U.S. Cl.

CPC ............ *C08G 69/14* (2013.01); *C08F 110/02* (2013.01); *C08J 3/226* (2013.01); *C08K 3/041* (2017.05); *C08K 3/042* (2017.05); *C08K 3/08* (2013.01); *C08K 3/14* (2013.01); *C08K 3/40* (2013.01); *C08K 5/053* (2013.01); *C08K 7/06* (2013.01); *C08K 9/06* (2013.01); *C08K 2003/0812* (2013.01); *C08K 2003/085* (2013.01); *C08K 2003/0862* (2013.01)

(58) Field of Classification Search

None

See application file for complete search history.

(56) References Cited

U.S. PATENT DOCUMENTS

| | | | | | |
|---|---|---|---|---|---|
| 5,373,046 | A * | 12/1994 | Okamura | C08K 3/04 | 524/451 |
| 6,121,388 | A * | 9/2000 | Umetsu | C08L 77/00 | 525/425 |
| 2006/0182916 | A1* | 8/2006 | Dowe | B29C 48/09 | 428/36.9 |
| 2013/0177765 | A1 | 7/2013 | Lim et al. | | |
| 2016/0222208 | A1* | 8/2016 | Park | C08L 23/0815 | |
| 2017/0306126 | A1* | 10/2017 | Miyamoto | C08K 7/06 | |
| 2018/0044485 | A1* | 2/2018 | Rousseaux | C08J 3/226 | |
| 2020/0032010 | A1* | 1/2020 | Liao | C08K 7/14 | |

FOREIGN PATENT DOCUMENTS

| | | | | |
|---|---|---|---|---|
| CN | 101875784 | A | 11/2010 | |
| CN | 103665841 | A | 3/2014 | |
| CN | 109438973 | A | 3/2019 | |
| CN | 109553962 | A | 4/2019 | |
| CN | 110835432 | A | 2/2020 | |
| CN | 108192218 | B | 10/2020 | |
| JP | 2013-544950 | A | 12/2013 | |
| KR | 2001-0044836 | A | 6/2001 | |
| KR | 2019-0074498 | A | 6/2019 | |
| KR | 2020-0046235 | A | 5/2020 | |
| KR | 2020-0085506 | A | 7/2020 | |
| KR | 102160190 | B1 | 9/2020 | |
| KR | 2021-0103413 | A | 8/2021 | |
| WO | WO-2014185371 | A1 * | 11/2014 | C08J 9/0066 |
| WO | WO-2016068101 | A1 * | 5/2016 | C08K 5/053 |
| WO | WO-2018178128 | A1 * | 10/2018 | C03C 13/00 |

* cited by examiner

*Primary Examiner* — Katarzyna I Kolb

(74) *Attorney, Agent, or Firm* — MCDONNELL BOEHNEN HULBERT & BERGHOFF LLP

(57) ABSTRACT

A thermoplastic composite material composition has improved electromagnetic radiation shielding performance. The thermoplastic composite material composition is a resin composition including a thermoplastic resin composition, high-density polyethylene, metal/ceramic powder, etc. The disclosed composition provides improved electromagnetic shielding performance, improved impact resistance, and good appearance.

15 Claims, No Drawings

THERMOPLASTIC COMPOSITE MATERIAL COMPOSITION HAVING EXCELLENT ELECTROMAGNETIC RADIATION SHIELDING PERFORMANCE

CROSS REFERENCE TO RELATED APPLICATIONS

The present application claims priority to Korean Patent Application No. 10-2021-0182386, filed Dec. 20, 2021, the entire contents of which is incorporated herein for all purposes by this reference.

BACKGROUND

The present disclosure relates to a thermoplastic composite material composition having improved electromagnetic radiation shielding performance. Specifically, the objective of the present disclosure is to provide a resin composition prepared by adding a new material such as high-density polyethylene, metal/ceramic powder, etc. to a thermoplastic resin composition, thereby providing a technology of securing electromagnetic radiation shielding performance, improved impact resistance, and giving a good-looking appearance.

DESCRIPTION OF THE RELATED ART

Recently, a large number of high-performance electronic parts have been introduced into automobiles, and thus automobiles are gradually becoming electronic devices. Due to various electronic control parts and devices introduced into automobiles to increase convenient driving of vehicles, emission of harmful electromagnetic radiation results in safety-related accidents such as malfunction and sudden unintended acceleration of vehicles, which emerges as a serious social problem. For this reason, there is the need for shielding and management of electromagnetic radiation and heat generated from the electronic parts embedded in vehicles.

In the past, metal materials were mainly used for purpose of electromagnetic radiation shielding. Since metal has high electrical conductivity compared to other materials and exhibits improved reflection of electromagnetic radiation, it has been used as an electromagnetic radiation shielding material in various fields. However, although metal products have excellent electromagnetic radiation shielding performance, they are disadvantageous in terms of final product price and productivity compared to extrusion and injection-based carbon polymer composite material products due to the die-casting process and post-processing process. In addition, in terms of weight reduction, which is the biggest requirement for next-generation functional materials for automobiles, carbon/polymer composite materials have the advantage of being able to reduce weight by about 30% or more compared to existing metals. For these reasons, research and development of carbon/polymer composite materials are being actively conducted not only by automotive parts manufacturers but also by materials manufacturers.

Since the content and characteristics (electromagnetic radiation shielding) of conductive filler added to secure electromagnetic radiation shielding performance are proportional, the conductive filler must be added in a large amount to meet the required level of electromagnetic radiation shielding. In this case, mechanical properties such as an increase in specific gravity, impact resistance, etc. and melt indexes of the composite material are lowered, resulting in the problem in that extrusion or injection processability is degraded. Therefore, efforts have been made to solve this problem.

SUMMARY

The present disclosure has been made to solve the above problems, the objective of the present disclosure is to provide a resin composition in which a new material such as high-density polyethylene, metal/ceramic powder, etc. is mixed with a thermoplastic resin composition, thereby providing a technology of securing electromagnetic radiation shielding performance, improved impact resistance, and good appearance.

The objective of the present disclosure is not limited to the above one. Other objectives of the present disclosure will be more apparent by the following description and will be realized by means and combination thereof set forth in the claims.

A thermoplastic composite material composition according to the present disclosure includes a base resin, a first filler including a master batch including a thermoplastic resin and a carbon material, a second filler including a non-carbon material, a carbon fiber, a flow improver, and a high-density polyethylene resin (HMWPE).

The base resin may include a polyamide-based resin, and the base resin may be included in an amount of 6 wt % to 20 wt % with respect to 100 wt % of the total composition.

The thermoplastic resin may include one or more compounds selected from the group consisting of polyamide 6, polyamide 66, polyamide 6,66 copolymer, polybutylene terephthalate, polyphenylene oxide, and polyphenylene sulfide.

The carbon material may include one or more carbon materials selected from the group consisting of reduced graphene oxide (r-GO), Ketjen black, carbon black, carbon nanotubes, and acetylene black.

The master batch may include 20 to 40 parts by weight of the carbon material per 100 parts by weight of the thermoplastic resin.

The first filler may be included in an amount of 50 wt % to 67 wt %.

The non-carbon material may include one or more materials selected from the group consisting of an inorganic filler, a metal powder, a ceramic powder, and combinations thereof.

The inorganic filler may include one or more selected from the group consisting of glass bead, glass bubble, and combinations thereof.

The metal powder may include one or more selected from the group consisting of copper, nickel, aluminum, and combinations thereof.

The ceramic powder may include silicon carbide.

The non-carbon material may have a spherical, tablet, or hollow shape.

The second filler may be included in an amount of 2 wt % to 8 wt %.

The carbon fiber may be surface-treated with one or more compatibilizers selected from the group consisting of a silane group, an epoxy group, and an imide group.

The carbon fiber may be included in an amount of 10 wt % to 20 wt %.

The flow improver may include a polyalcohol-based compound, and the composition may include the flow improver in an amount of 2 wt % to 4 wt %.

The high-density polyethylene resin (HMWPE) may be included in an amount of 2 wt % to 4 wt %.

The thermoplastic composite material composition may further include one or more additives selected from the group consisting of a thermal stabilizer, an active agent, a UV stabilizer, a lubricant, an antioxidant, a photo stabilizer, a release agent, and combinations thereof.

The thermoplastic composite material composition may have a flow index of 50 g/10 min or more, a tensile strength of 160 MPa or more, an impact resistance of 8.0 $KJ/m^2$ or more, and an electromagnetic wave shielding efficiency of 71 dB (@1 GHz) or more.

In addition, a molded article according to the present disclosure may include the thermoplastic composite material composition.

The molded article may include an electronic part related to stability and security for a vehicle.

The present disclosure provides the advantages described below.

The present disclosure provides a thermoplastic composite material composition with improved emotional quality, high rigidity, high impact resistance, and high electromagnetic radiation shielding performance, due to increased mechanical properties (impact resistance, etc.) and flow (processing properties) through the application of high-density polyethylene.

Compared to the existing electromagnetic radiation shielding carbon/composite material, the composition of the present disclosure has excellent electromagnetic radiation shielding performance and can reduce raw material cost by the use of a carbon-based (carbon black, carbon fiber) filler and a spherical inorganic filler (glass bead/glass bubble) and the optimization of the mixture of metal and ceramic powder. Therefore, the composition of the present disclosure is applicable to future automobiles. In addition, the composition of the present disclosure may find further applications in various safety- and security-related electronic vehicle parts expected to be mandatorily equipped in the future automobiles and in other industrial parts.

The effects of the present disclosure are not limited to the above effects. The effects of the present disclosure should be understood to include all the effects that can be inferred from the following description.

DETAILED DESCRIPTION

The above objectives, other objectives, features, and advantages of the present disclosure will be easily understood through the following preferred embodiments related to the accompanying drawings. However, the present disclosure is not limited to the embodiments described herein and may be embodied in other forms. Rather, the embodiments introduced herein are provided so that the disclosed content may be thorough and complete and that the spirit of the present disclosure may be sufficiently conveyed to those skilled in the art.

In describing each drawing, similar reference numerals are used for similar elements. In the accompanying drawings, the dimensions of the structures are enlarged than the actual size for clarity of the present disclosure. Terms such as first, second, etc. may be used to describe various elements, but the elements should not be limited thereto. The terms are used only for the purpose of distinguishing one element from another. For example, without departing from the scope of the present disclosure, the first element may be referred to as a second element, and similarly, the second element may also be referred to as a first element. The singular expression includes the plural expression unless the context clearly means differently otherwise.

In the present specification, it should be understood that the terms such as "include" or "have" are intended to designate the presence or addition of a feature, number, step, operation, element, part, or a combination thereof described in the specification and not to preclude the presence or addition of one or more other features, numbers, steps, operations, elements, parts, or combinations thereof. In addition, when a part such as a layer, film, region, plate, etc. is said to be "on" another part, this includes not only "directly above" the other part, but also the case where there is another part in the middle. Conversely, when a part of a layer, film, region, plate, etc. is said to be "underneath" another part, this includes not only "directly under" the other part, but also the case where there is another part in the middle.

Unless otherwise specified, all numbers, values, and/or expressions expressing the amount of ingredient, reaction condition, polymer composition, and combination product used herein, are essentially approximations reflecting the various uncertainties in the measurement resulting from obtaining these values among others, and so they should be understood as being modified by the term "about" in all cases. In addition, when a numerical range is disclosed in the present description, such range is continuous and includes all values from the minimum to the maximum inclusive of the maximum, unless otherwise indicated. Furthermore, when such range refers to an integer, all integers including from the minimum to the maximum inclusive of the maximum value, unless otherwise indicated.

A thermoplastic composite material composition according to the present disclosure may include a base resin, a first filler including a master batch including a resin material and a carbon material, a second filler including a non-carbon material, a carbon fiber, a flow improver, and a high-density polyethylene resin (HMWPE).

Specifically, the thermoplastic composite material composition may further include an additive.

Each component constituting the thermoplastic composite material composition according to the present disclosure will be described in more detail below.

(A) Base Resin

The base resin according to the present disclosure includes a polyamide-based resin.

The base resin according to the present disclosure may be included in an amount of 6 wt % to 20 wt % with respect to 100 wt % of the total composition.

(B) First Filler

The first filler according to the present disclosure may include a master batch including a thermoplastic resin and a carbon material.

The master batch including the thermoplastic resin and the carbon material according to the present disclosure is to improve the electromagnetic radiation shielding effect by facilitating the formation of electrical conductive pathways, and to prevent degradation of moldability and appearance properties by increasing the flow.

The thermoplastic resin may include one or more compounds selected from the group consisting of polyamide 6, polyamide 66, polyamide 6,66 copolymer, polybutylene terephthalate, polyphenylene oxide, and polyphenylene sulfide.

As the thermoplastic resin according to the present disclosure, any resin can be used without limitation if the resin can be used for preparation of an electromagnetic radiation shielding polymer composition.

The carbon material according to the present disclosure may include one or more carbon materials selected from the group consisting of reduced graphene oxide (r-GO), Ketjen black, carbon black, carbon nanotubes, and acetylene black.

The master batch according to the present disclosure may include 20 to 40 parts by weight of the carbon material per 100 parts by weight of a thermoplastic resin.

When the content of the carbon material is less than 20 parts by weight, an electromagnetic radiation shielding effect is insignificant. On the other hand, when the content exceeds 40 parts by weight, mechanical properties and flowability are deteriorated due to low dispersibility, which may cause other quality problems of products.

The first filler according to the present disclosure may be included in an amount of 50 wt % to 67 wt % with respect to the total thermoplastic composite material composite.

(C) Second Filler

The second filler according to the present disclosure may include a non-carbon material.

The second filler according to the present disclosure causes multiple reflections, which are absorbed by the first filler and the carbon fiber, so that the shielding efficiency can be maximized.

The non-carbon material according to the present disclosure may include one or more materials selected from the group consisting of an inorganic filler, a metal powder, a ceramic powder, and combinations thereof.

The inorganic filler may include one or more selected from the group consisting of glass bead, glass bubble, and combinations thereof.

The metal powder may include one or more selected from the group consisting of copper, nickel, aluminum, and combinations thereof.

The ceramic powder may include silicon carbide.

The non-carbon material may have a spherical, tablet, or hollow shape.

The second filler according to the present disclosure may be included in an amount of 2 wt % to 8 wt % with respect to the total thermoplastic composite material composition.

When the content of the second filler is less than 2 wt %, the effect of improving the shielding performance is insignificant due to insignificant multiple refection and scattering effects. On the other hand, when the content exceeds 8 wt %, the filler is difficult to disperse in the resin, and the mechanical properties are deteriorated.

(D) Carbon Fiber

The carbon fiber according to the present disclosure may be surface-treated with one or more compatibilizers selected from the group consisting of a silane group, an epoxy group, and an imide group.

When the carbon fiber according to the present disclosure is not used, the mechanical properties (for example, rigidity) are deteriorated due to the weak coupling between the polymer and the carbon fiber.

The carbon fiber according to the present disclosure may be included in an amount of 10 wt % to 20 wt % with respect to the total thermoplastic composite material composition. The carbon fiber may be used alone or in the form of a mixture.

When the content of the carbon fiber is less than 10 wt %, the electromagnetic radiation shielding effect and the impact resistance are deteriorated whereas when the content it exceeds 20 wt %, the raw material cost is increased and the processability is deteriorated due to poor flowability.

(E) Flow Improver

The flow improver according to the present disclosure serves to minimize the processability deterioration attributable to the flowability reduction caused by the high-density polyethylene and master batch.

The flow improver according to the present disclosure includes a polyalcohol-based compound.

The flow improver according to the present disclosure may be included in an amount of 2 wt % to 4 wt % with respect to the total thermoplastic composite material composition.

When the content of the flow improver is less than 2 wt %, the flow improving effect is insignificant whereas when the content exceeds 4 wt %, there may occur quality problems due to whitening and degradation of appearance quality attributable to gas generation and appearance protrusion.

(F) High-Density Polyethylene Resin (HNWPE)

The high-density polyethylene resin (HMWPE) according to the present disclosure may be included in an amount of 2 wt % to 4 wt % with respect to the total thermoplastic composite material composition.

When the content of the high-density polyethylene resin (HMWPE) is less than 2 wt %, the hinge properties and impact resistance are deteriorated whereas when the content exceeds 4 wt %, the mutual bonding between components in the composition, resulting in deterioration in mechanical properties.

(G) Additive

The thermoplastic composite material composition according to the present disclosure may further include one or more additives selected from the group consisting of a thermal stabilizer, an active agent, a UV stabilizer, a lubricant, an antioxidant, a photo stabilizer, a release agent, and combinations thereof.

In addition, the thermoplastic composite material composition according to the present disclosure may exhibit a flow index of 50 g/10 min or more, a tensile strength of 160 MPa or more, an impact resistance 8.0 KJ/m$^2$ or more, and an electromagnetic radiation shielding performance of 71 dB (@1 GHz) or more.

In another aspect, the present disclosure relates to a molded article including the thermoplastic composite material composition.

The molded article is not limited in the applications thereof but may be preferably applied to future automobiles.

Specifically, the molded article may be a stability- or security-related electronic parts for automobiles.

Hereinafter, the present disclosure will be described in more detail with reference to the following examples and comparative examples. However, the technical idea of the present disclosure is not limited by them.

Example 1 and Comparative Examples 1 to 11

First, each of the compositions having the components and contents illustrated in Tables 1 and 2 below was melted and kneaded with a twin screw extruder and injection-molded through an injection molding machine (Fanuc Corporation, Japan, 100 ton) to produce molded articles.

TABLE 1

| Classification (Unit: parts by weight) | | Examples and Comparative Examples | | |
|---|---|---|---|---|
| Master batch | Thermoplastic resin | 100 | 100 | 100 |
| | Carbon black | 20 | 30 | 40 |

TABLE 2

| Class (Unit: wt %) | Example Final verification of composite material | | | Comparative example Conductive M/B content verification | | | Flow improvement verification | | | Impact improvement verification | | | Optimization of appearance quality | |
|---|---|---|---|---|---|---|---|---|---|---|---|---|---|---|
| | 1 | 2 | 3 | 1 | 2 | 3 | 4 | 5 | 6 | 7 | 8 | 9 | 10 | 11 |
| A | 20 | 8 | 6 | 24 | 41 | 49 | 40 | 38 | 36 | 36 | 34 | 32 | 22 | 10 |
| B | 50 | 67 | 67 | 50 | 33 | 25 | 33 | 33 | 33 | 33 | 33 | 33 | 50 | 67 |
| C | 20 | 15 | 15 | 25 | 25 | 25 | 25 | 25 | 25 | 25 | 25 | 25 | 20 | 15 |
| D | 3 | 3 | 3 | — | — | — | 1 | 3 | 5 | 3 | 3 | 3 | 3 | 3 |
| E | 4 | 4 | 4 | — | — | — | — | — | — | 2 | 4 | 6 | 4 | 4 |
| F | 2 | 2 | 2 | — | — | — | — | — | — | — | — | — | — | — |
| G | 1 | 1 | 1 | 1 | 1 | 1 | 1 | 1 | 1 | 1 | 1 | 1 | 1 | 1 |

A: base resin (polyamide-based resin)
B: first filler (thermoplastic resin and carbon material conductive master batch)
C: carbon fiber
D: flow improver (polyalcohol-based compound)
E: high-density polyethylene (HMWPE)
F: second filler
G: additive (antioxidant, lubricant)

Experimental Example

Physical properties of the compositions prepared in Example 1 and Comparative Examples 1 to 11 were measured. The results are shown in Table 3.

Test Method

1. Laboratory standard condition: Maintained a laboratory temperature of 23±2° C. and relative humidity of 50±5%.

Tensile strength: Measured according to ISO 527 regulations and evaluated at a speed of 5 mm/min.

Impact resistance: Measured according to ISO 180 regulations with notched specimens having a size of 80*10*4 (mm in each side) DLAU.

Electromagnetic radiation shielding efficiency: Measured according to ASTM D 4935 regulations with specimens having a size of 100*100*3.2 (mm in each side).

TABLE 3

| Class | Example Final verification of composite material | | | Comparative example Conductive M/B content verification | | | Flow improvement verification | | | Impact improvement verification | | | Optimization of appearance quality | |
|---|---|---|---|---|---|---|---|---|---|---|---|---|---|---|
| | 1 | 2 | 3 | 1 | 2 | 3 | 4 | 5 | 6 | 7 | 8 | 9 | 10 | 11 |
| H | 51 | 54 | 57 | 8 | 13 | 23 | 32 | 48 | 63 | 45 | 43 | 35 | 53 | 56 |
| I | 174 | 170 | 162 | 188 | 216 | 223 | 189 | 186 | 178 | 187 | 183 | 174 | 181 | 176 |
| J | 8.7 | 9.2 | 8.3 | 5.9 | 6.8 | 8.4 | 5.5 | 5.8 | 5.1 | 8.4 | 9.6 | 11.5 | 8.8 | 8.3 |
| K | 73 | 71 | 71 | 68 | 56 | 49 | 69 | 72 | 65 | 71 | 71 | 69 | 64 | 59 |
| L | better | better | better | Very bad | bad | bad | bad | good | bad | good | good | bad | better | better |

H: flow index (unit: g/10 min)
I: tensile strength (unit: MPa)
J: impact resistance (unit: $KJ/m^2$)
K: electromagnetic radiation shielding efficiency
L: emotional quality 2. Laboratory standard condition: 48 hours after the manufacture of test specimens, the test specimens were left in the laboratory standard condition for more than 24 hours.
3. Number of specimens: For each test item, 7 specimens were tested, and an arithmetic average value of 5 measurement values, excluding 2 measurement values, which are largest and smallest values, among 7 measurement values.
4. Test conditions Flow index: Measured according to ISO regulations and evaluated under measurement conditions of 275° C. and 5 kg.

Referring to Table 3, Comparative Examples 1 to 3 did not use a flow improver, high-density polyethylene, and second filler. It was confirmed that Comparative Examples 1 to 3 are deteriorated in the flow index, impact resistance, electromagnetic radiation shielding efficacy, and emotional quality compared to Examples 1 to 3.

Comparative Examples 4 to 6 were improved in flow index compared to Comparative Examples 1 to 3 because of the use of a flow improver. However, since high-density polyethylene and a second filler were not used, it was confirmed that Comparative Examples 4 to 6 were inferior to Examples 1 to 3 in terms of flow index, impact resistance, electromagnetic radiation shielding efficacy, and emotional quality.

Comparative examples 7 to 9 did not use a second filler. Therefore, it was confirmed that the flow index and emotional quality are degraded compared to Examples 1 to 3. In addition, in the case of Comparative Example 9 which used 4 wt % or more of high-density polyethylene, it was confirmed that the physical properties were degraded compared to Comparative Examples 7 and 8.

In the case of Comparative Examples 10 to 11, an adequate amount of high-density polyethylene was used but the filler was not used. Therefore, it was confirmed that the electromagnetic radiation shielding performance was degraded compared to Examples 1 to 3.

Therefore, the thermoplastic composite material composition according to the present disclosure may have excellent physical properties, improved emotional quality, and improved electromagnetic radiation shielding performance when the base resin, the first and second fillers, the carbon fiber, and the high-density polyethylene are mixed in an appropriate mixing ratio.

Although the embodiments of the present disclosure have been described above, those of ordinary skill in the art to which the present disclosure pertains will understand that the present disclosure may be implemented in other specific forms without changing the technical spirit or essential features. Therefore, it should be understood that the embodiments described above are illustrative in all respects and not restrictive.

The invention claimed is:

1. A thermoplastic composite material composition comprising:

a base resin;

a first filler comprising a master batch comprising a thermoplastic resin and a carbon material;

a second filler comprising a non-carbon material;

a carbon fiber;

a flow improver; and a high-density polyethylene resin;

wherein, based on the total weight of the thermoplastic composite material composition, the thermoplastic composite material composition comprises 6 wt % to 20 wt % of the base resin, wherein the carbon fiber is surface-treated with one or more substances selected from the group consisting of: a silane group, an epoxy group, and an imide group, wherein, based on the total weight of the thermoplastic composite material composition, the thermoplastic composite material composition comprises:

50 wt % to 67 wt % of the first filler;

2 wt % to 8 wt % of the second filler;

2 wt % to 4 wt % of the flow improver; and 2 wt % to 4 wt % of the high-density polyethylene resin, and wherein the master batch comprises 20 to 40 parts by weight of the carbon material per 100 parts by weight of the thermoplastic resin.

2. The composition of claim 1, wherein the base resin comprises a polyamide-based resin.

3. The composition of claim 1, wherein the thermoplastic resin comprises one or more compounds selected from the group consisting of polyamide 6, polyamide 66, polyamide 6,66 copolymer, polybutylene terephthalate, polyphenylene oxide, and polyphenylene sulfide.

4. The composition of claim 1, wherein the carbon material comprises one or more carbon materials selected from the group consisting of reduced graphene oxide (r-GO), Ketjen black, carbon black, carbon nanotubes, and acetylene black.

5. The composition of claim 1, wherein the non-carbon material includes one or more materials selected from the group consisting of: an inorganic filler, a metal powder, a ceramic powder, and combinations thereof.

6. The composition of claim 5, wherein the inorganic filler comprises one or more selected from the group consisting of: glass bead, glass bubble, and combinations thereof.

7. The composition of claim 5, wherein the metal powder comprises one or more selected from the group consisting of: copper, nickel, aluminum, and combinations thereof.

8. The composition of claim 5, wherein the ceramic powder comprises silicon carbide.

9. The composition of claim 1, wherein the non-carbon material has a spherical, tablet, or hollow shape.

10. The composition of claim 1, wherein, based on the total weight of the thermoplastic composite material composition, the thermoplastic composite material composition comprises 10 wt % to 20 wt % of the carbon fiber.

11. The composition of claim 1, wherein the flow improver comprises a polyalcohol-based compound.

12. The composition of claim 1, wherein the thermoplastic composite material composition further comprises one or more additives selected from the group consisting of: a thermal stabilizer, an active agent, a UV stabilizer, a lubricant, an antioxidant, a photo stabilizer, a release agent, and combinations thereof.

13. The composition of claim 1, wherein the thermoplastic composite material composition exhibits a flow index of 50 g/10 min or more, a tensile strength of 160 MPa or more, an impact resistance of 8.0 $KJ/m^2$ or more, and an electromagnetic radiation shielding efficiency of 71 dB (@1 GHz) or more.

14. A molded article comprising the thermoplastic composite material composition of claim 1.

15. The molded article of claim 14, wherein the molded article is an electronic part related to stability and security for a vehicle.

* * * * *